US011305217B2

(12) United States Patent
Salom et al.

(10) Patent No.: US 11,305,217 B2
(45) Date of Patent: Apr. 19, 2022

(54) FILTER ELEMENT FOR LIQUID FILTRATION

(71) Applicant: MANN+HUMMEL GMBH, Ludwigsburg (DE)

(72) Inventors: Rafael Salom, Remseck (DE); Martin Weindorf, Kornwestheim (DE); Idriss Razgani, Tangier (MA)

(73) Assignee: MANN+HUMMEL GmbH, Ludwigsburg (DE)

( * ) Notice: Subject to any disclaimer, the term of this patent is extended or adjusted under 35 U.S.C. 154(b) by 210 days.

(21) Appl. No.: 16/672,660

(22) Filed: Nov. 4, 2019

(65) Prior Publication Data

US 2020/0129891 A1    Apr. 30, 2020

Related U.S. Application Data

(63) Continuation of application No. PCT/EP2018/061418, filed on May 3, 2018.

(30) Foreign Application Priority Data

May 4, 2017    (DE) ..................... 10 2017 004 275.6

(51) Int. Cl.
*B01D 29/23*    (2006.01)
*B01D 36/00*    (2006.01)

(52) U.S. Cl.
CPC ........... *B01D 29/23* (2013.01); *B01D 36/005* (2013.01); *B01D 36/006* (2013.01); *B01D 36/008* (2013.01); *B01D 2201/291* (2013.01); *B01D 2201/304* (2013.01)

(58) Field of Classification Search
CPC .... B01D 29/23; B01D 36/005; B01D 36/006; B01D 36/008; B01D 2201/291; B01D 2201/304; B01D 29/15; B01D 35/16; B01D 35/153; B01D 2201/31; B01D 35/14
USPC ................. 210/324, 450, 493.2, 248, DIG. 5
See application file for complete search history.

(56) References Cited

U.S. PATENT DOCUMENTS

| | | | |
|---|---|---|---|
| 6,328,883 B1 | 12/2001 | Jensen | |
| 2013/0048552 A1* | 2/2013 | Eberle | ............... B01D 35/306 210/345 |
| 2016/0214038 A1 | 7/2016 | Morris et al. | |

FOREIGN PATENT DOCUMENTS

| | | |
|---|---|---|
| DE | 1248017 B | 8/1967 |
| DE | 102005015194 A1 | 10/2006 |
| DE | 202005014689 U1 | 2/2007 |
| DE | 102015014600 A1 | 5/2016 |

(Continued)

*Primary Examiner* — Madeline Gonzalez

(57) ABSTRACT

A filter element for liquid filtration has a hollow-cylindrical filter medium body and an end disk covering an end face of the filter medium body. A central cutout axially penetrates the end disk. An outflow channel for liquid to be filtered or filtered liquid is arranged at the end disk and connects to a liquid collecting space. The outflow channel extends from a radially outward wall surface of the filter medium body to the central cutout of the end disk. The outflow channel is controlled by a drainage device. A filter device with a filter housing provided with such a filter element has a drainage device that controls the outflow channel. A filter device with a drainage device having a first drainage position for draining only water and a second drainage position draining water from a water collecting space and liquid from a liquid collecting space is provided.

10 Claims, 9 Drawing Sheets

(56) References Cited

FOREIGN PATENT DOCUMENTS

| | | |
|---|---|---|
| DE | 102015003914 A1 | 9/2016 |
| DE | 102016003519 A1 | 10/2016 |
| EP | 1599273 A1 | 9/2004 |
| EP | 1477215 A1 | 11/2004 |
| EP | 2136901 A1 | 4/2009 |
| EP | 2072768 B1 | 6/2009 |

\* cited by examiner

FILTER ELEMENT FOR LIQUID FILTRATION

CROSS-REFERENCE TO RELATED APPLICATIONS

This application is a continuation application of international application No. PCT/EP2018/061418 having an international filing date of 3 May 2018 and designating the United States, the international application claiming a priority date of 4 May 2017 based on prior filed German patent application No. 10 2017 004 275.6, the entire contents of the aforesaid international application and the aforesaid German patent application being incorporated herein by reference.

BACKGROUND OF THE INVENTION

The invention concerns a filter element for liquid filtration, for example, for a fuel filter or oil filter, with a hollow-cylindrical filter medium body that is covered at least at one end face by an end disk.

In EP 2 136 901 B1, a liquid filter for filtration of fuel or oil is described that comprises a filter element with hollow-cylindrical filter medium body in a filter housing which is flowed through by the liquid to be filtered radially from the exterior to the interior. The purified liquid is drained from the interior in the filter medium body axially through a central opening in an end disk at the filter medium body. A drainage device projects into the oppositely positioned end disk at the filter medium body and comprises a drainage screw with inwardly positioned outflow channel, wherein the drainage screw is screwed into an inner thread which is embodied as one piece with the closed end disk. In a drainage position, the drainage screw is partially unscrewed from the receiving thread and is in flow communication with a bottom-side collecting space from which the collected liquid can be drained through the drainage device for servicing purposes. In the closed position, the drainage screw of the drainage device is screwed into the receiving thread to such an extent that the flow communication to the bottom-side collecting space is interrupted.

SUMMARY OF THE INVENTION

The invention has the object to configure, with simple constructive measures, a filter element with a hollow-cylindrical filter medium body and at least one end disk at an end face in such a way that, as needed, the liquid to be filtered or filtered liquid can be drained from a liquid collecting space at or in the filter medium body.

This object is solved according to the invention in that, at or adjacent to the end disk, an outflow channel for liquid to be filtered or filtered liquid from a liquid collecting space is formed and the outflow through the outflow channel can be controlled by a drainage device, wherein the outflow channel extends from a radially outwardly positioned wall surface of the filter medium body to a central cutout in the end disk which axially penetrates the end disk.

The dependent claims provide expedient further embodiments.

The filter element according to the invention is used for liquid filtration, for example, for a fuel filter or an oil filter in a motor vehicle. The filter element comprises a hollow-cylindrical filter medium body that is flowed through in radial direction—relative to the longitudinal cylinder axis of the filter medium body—by the fluid to be purified. In a preferred embodiment, the flow is realized in radial direction from the exterior to the interior so that the exterior side of the filter medium body represents the raw side and the inner side the clean side. In the filter medium body, a cylindrical interior is provided in which, for radial flow from the exterior to the interior, the purified fluid is received and from where the purified fluid is axially drained.

The hollow-cylindrical filter medium body comprises an end disk at least at one end face, preferably at both oppositely positioned end faces, respectively. At or adjacent to an end disk, an outflow channel for the liquid to be filtered or already filtered liquid is formed which collects in a liquid collecting space at the filter medium body. The liquid collecting space is located either at the raw side and/or at the clean side of the filter medium body, preferably at the clean side. Through the outflow channel, as needed, the liquid to be filtered or already filtered liquid can be drained from the liquid collecting space by means of a drainage device which is adjustable between an open drainage position and a closed position in which drainage of the liquid through the outflow channel is prevented. Accordingly, the outflow through the outflow channel can be controlled by means of the drainage device.

The outflow channel extends from a radially outwardly positioned wall surface of the filter medium body to a central cutout in the end disk. Cutout is to be understood as a penetrating opening which extends in axial direction through the end disk to an interior of the filter medium body. This means that the opening connects the interior of the filter medium body with an exterior; it penetrates or perforates the end disk.

The outflow channel is in particular fixedly connected to the end disk. Embodiments are conceivable in which the outflow channel is embodied as one piece together with the end disk, in particular integrated into the end disk or arranged at the bottom side of the end disk, as well as embodiments of the outflow channel as a separate component that is however fixedly connected to the end disk.

The outflow channel extends advantageously in radial direction between the radially outwardly positioned exterior side of the end disk and the center of the end disk into which a cutout is introduced through which the liquid can be drained axially. Alternatively, a non-radial extension of the outflow channel in or at the end disk is conceivable also; moreover, embodiments of the outflow channel that are straight, curved and/or angled once or multiple times are possible. In any case, the outflow channel connects the liquid collecting space in or at the filter medium body with the drainage device through which, as needed, the liquid can be drained from the liquid collecting space, for example, for servicing purposes for a facilitated removal of the filter element from the receiving filter housing.

The outflow channel at or adjacent to the end disk of the filter medium body enables a targeted drainage of the fluid which has already been filtered by the filter element or is still to be filtered. It is in particular possible, with the drainage device being open, to drain the fluid without contact with a water collecting space at the bottom of the receiving filter housing. Moreover, it is important, in particular in a filter device which is embodied for filtering diesel fuel, that the separated water can be drained without having to drain residual diesel.

The outflow channel connects advantageously the annular liquid collecting space at the radial exterior side of the filter medium body with the drainage device. For radial flow through the filter medium body from the exterior to the interior, the fluid is thus drained from the raw side through the outflow channel with open drainage device. This results in an advantageous effect in that, in interaction with the drainage device by actuation of a single drainage element, the raw side as well as the clean side of the filter can be drained which, in particular in case of large-volume filters for trucks, marine applications or stationary applications, simplifies the servicing action significantly.

In a further advantageous embodiment, the filter medium body of the filter element is provided with an axially extending water fill level sensor. The water fill level sensor extends in particular coaxial to the longitudinal axis of the filter element through the filter medium body and can be arranged optionally in a tube. The water fill level sensor extends in this embodiment preferably across the entire axial length of the filter medium body and projects past the filter medium body at both axial end faces. This embodiment makes it possible to realize the electrical connection of the water fill level sensor at an axial side outside of the filter medium body and, as needed, outside of the filter housing and to perform sensing of the water level in a water collecting space at the oppositely positioned axial end face outside of the filter medium body. The water collecting space is in particular formed at the inwardly positioned bottom of the receiving filter housing. The end face of the water fill level sensor projects into the water collecting space and is thus capable of detecting a defined water level in the water collecting space, whereupon a signal is generated that requests draining of the collected water in the water collecting space.

Drainage of the water from the water collecting space is realized preferably through the same drainage device through which also the liquid to be filtered or already filtered liquid is drained from the liquid collecting space at the filter medium body. When opening the drainage device, it is thus possible to drain at the same time the liquid from the liquid collecting space and the water from the water collecting space.

A further aspect of the invention concerns a filter device, which is used as a liquid filter, for example, as a fuel filter or oil filter, and comprises an afore described filter element in a receiving filter housing. In the filter housing, a water collecting space is provided, preferably at the bottom of the filter housing. In addition, the filter housing accommodates the drainage device which is adjustable between an open water drainage position and a closed position.

A further aspect of the invention concerns a filter device which is used as a liquid filter, in particular for filtration of fuel or oil, and a filter element with a hollow-cylindrical filter medium body as well as a receiving filter housing with a water collecting space and a drainage device. The filter element is advantageously embodied as described above. The drainage device can be adjusted between a first drainage position, a second drainage position, and a closed position.

In the first drainage position, exclusively the water of the water collecting space is drained while a flow path of the liquid to be filtered or filtered liquid out of the liquid collecting space is blocked so that the liquid is not drained from the liquid collecting space.

In the second drainage position, the water of the water collecting space as well as the liquid to be filtered or already filtered liquid is drained from a liquid collecting space in or at the filter medium body of the filter element.

This embodiment has the advantage that, when a defined maximum water level in the water collecting space has been reached, the collected water can be drained through the drainage device in the first drainage position while the liquid in the liquid collecting chamber is not drained. When however the filter element is to be removed from the filter housing, for example, for servicing purposes, the drainage device can be moved into the second drainage position in which the water is drained from the water collecting space and the liquid is drained from the liquid collecting space. In the closed position of the drainage device, on the other hand, no drainage of water or liquid is possible.

According to an advantageous embodiment, the drainage device comprises an axially adjustable drainage screw which projects into a cutout in the end disk. The drainage screw is advantageously screwed into a component of the filter housing, in particular a sleeve in the bottom of the filter housing that comprises an inner thread into which an outer thread of the drainage screw can be screwed. In the closed position, the drainage screw is preferably completely screwed in and a flow path through the sleeve is blocked. Upon unscrewing the drainage screw until the first drainage position is reached, initially the outflow channel in or adjacent to the end disk remains closed but a flow path out of the water collecting chamber via the sleeve is opened. Upon further unscrewing of the drainage screw, the latter reaches the second drainage position in which in addition also the outflow channel at or adjacent to the end disk is opened so that the liquid is drained from the liquid collecting space via the outlet channel and the sleeve, in addition to the water in the water collecting space.

According to a further expedient embodiment, the water fill level sensor projects into a drainage element of the drainage device, in particular into the drainage screw. In this context, it is expedient that at the drainage element two axially spaced-apart sealing rings are arranged which are arranged in the closed position of the drainage element above and below the outflow channel. This ensures that the liquid can be drained neither from the liquid collecting space at the exterior side of the filter medium body nor from the interior of the filter medium body through the outflow channel or immediately through the drainage element. In the first drainage position, the flow path from the outflow channel to the sleeve in the bottom of the filter housing remains closed also. Only upon reaching the second drainage position, the outflow channel is opened so that the liquid in the filter element can be drained.

According to yet another expedient embodiment, at least one flow opening is provided in the wall of the drainage element in a section outside of the interior of the hollow-cylindrical filter medium body. The water in the water collecting space can spread through the flow opening in the wall of the drainage element to the water fill level sensor which protrudes into the drainage element so that reaching of a maximum permissible water level can be detected by the water fill level sensor.

In addition or as an alternative, it is also possible to provide in the bottom of the filter housing a water fill level sensor which projects into the water collecting space. In this case, a signal is produced also by means of the water fill level sensor as soon as a defined water level is reached.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
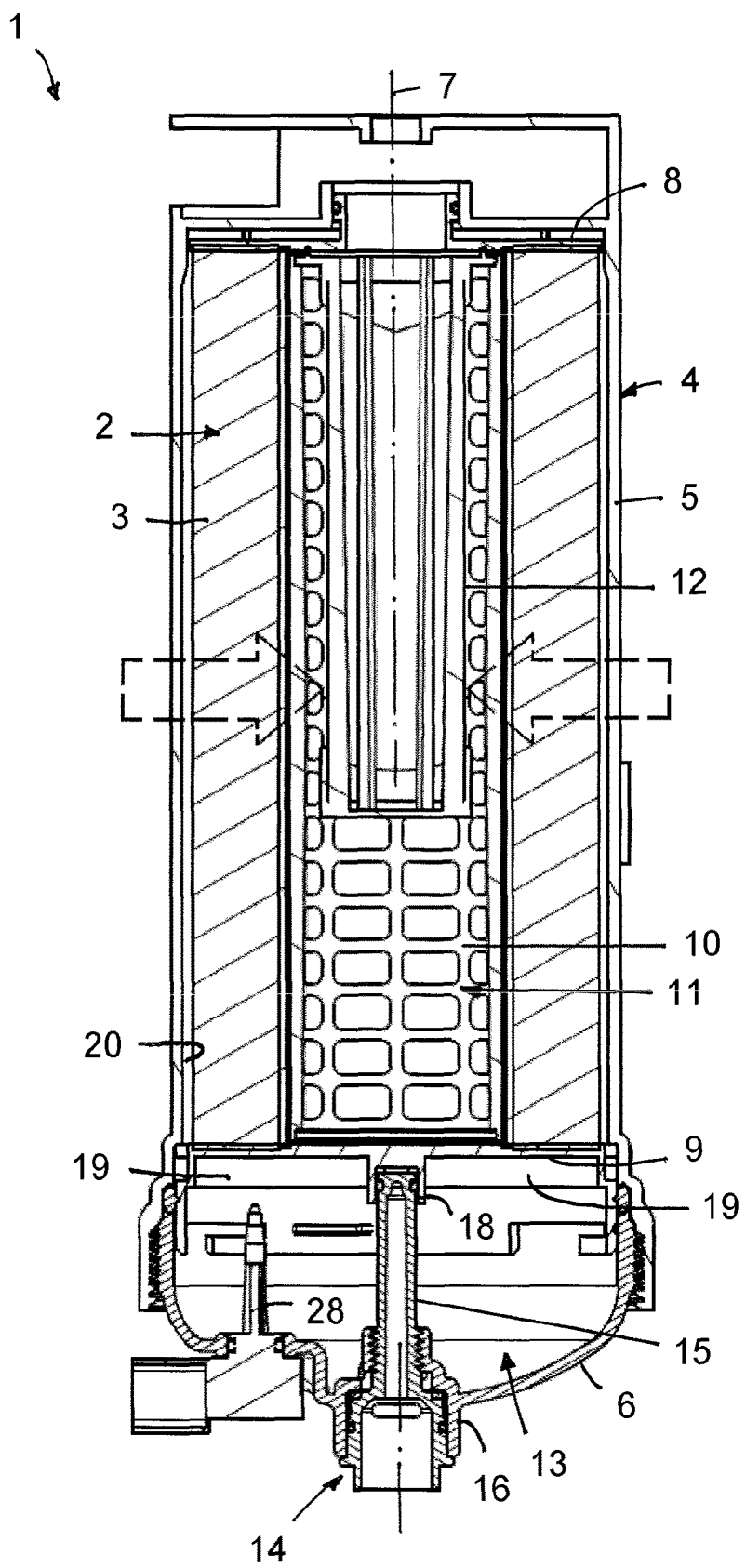
FIG. 1 shows a longitudinal section of a filter device for liquid filtration, with a hollow-cylindrical filter element in a filter housing and with a drainage device which is integrated into the bottom of the filter housing.
Figure 2:
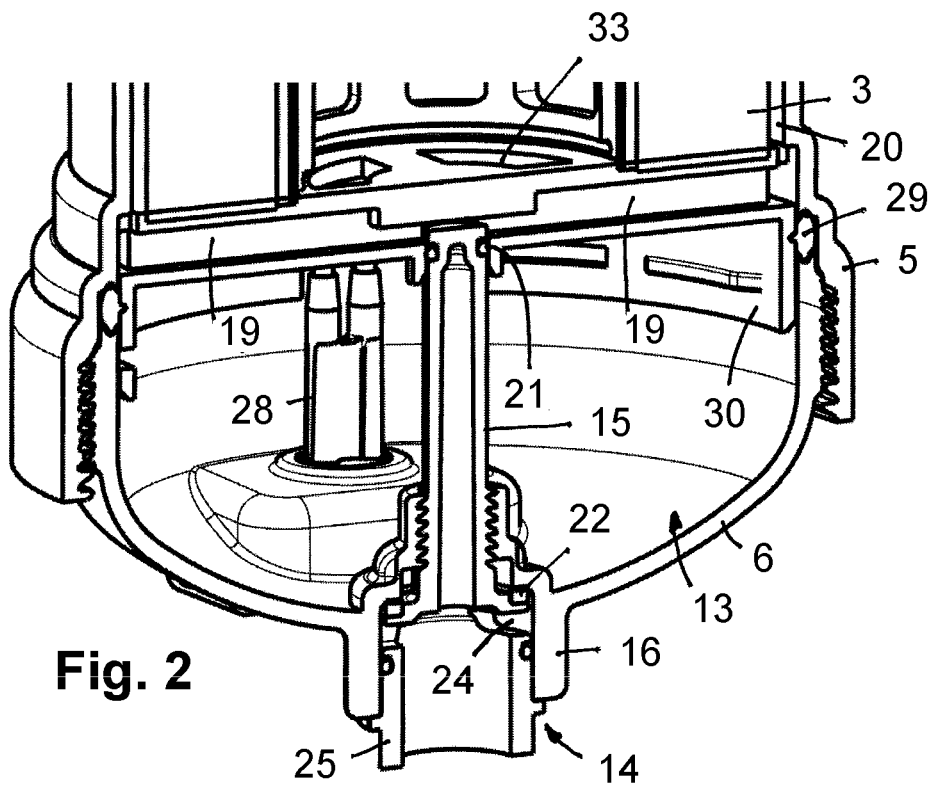
FIG. 2 shows the bottom region of the filter device according to FIG. 1 in a perspective view with the drainage device in closed position.

The first embodiment according to FIGS. 1 to 7 concerns a filter device for liquid filtration, in particular a fuel filter, for example, for filtration of diesel fuel. The filter device 1 comprises a filter element 2 with a hollow-cylindrical filter medium body 3 in a receiving filter housing 4, which is comprised of a cylindrical filter base housing 5 and a lid-shaped bottom part 6 which can be screwed onto the bottom side of the filter base housing 5. The filter medium body 3, as indicated by the arrows, is flowed through, relative to the longitudinal cylinder axis 7 of the filter device 1 and filter element 2, from the exterior to the interior. The filter medium body 3 comprises at its top end face an annular end disk 8 and at its bottom end face a closed end disk wherein the end disks 8, 9 are fixedly connected to the filter medium body 3 and, together with the filter medium body 3, form the filter element 2. At the inner side of the hollow-cylindrical filter medium body 3, a support frame 10 is provided which lines the interior 11 in the filter medium body 3. Upon radial flow from the exterior to the interior, the exterior side of the filter medium body 3 forms the raw side and the inner side forms the clean side. The purified fluid is drained from the interior 11 axially via the end disk 8 that comprises a central cutout.

In the interior 11 in the filter medium body 3, there is a water separation screen 12 at which water droplets of the liquid to be filtered are separated. The separated water flows in downward direction and is collected in a water collecting space 13 in the bottom part 6 of the filter housing 4 wherein the separated water is guided axially in downward direction to the water collecting space via the end disk 9 that has a cutout.

Figure 3:
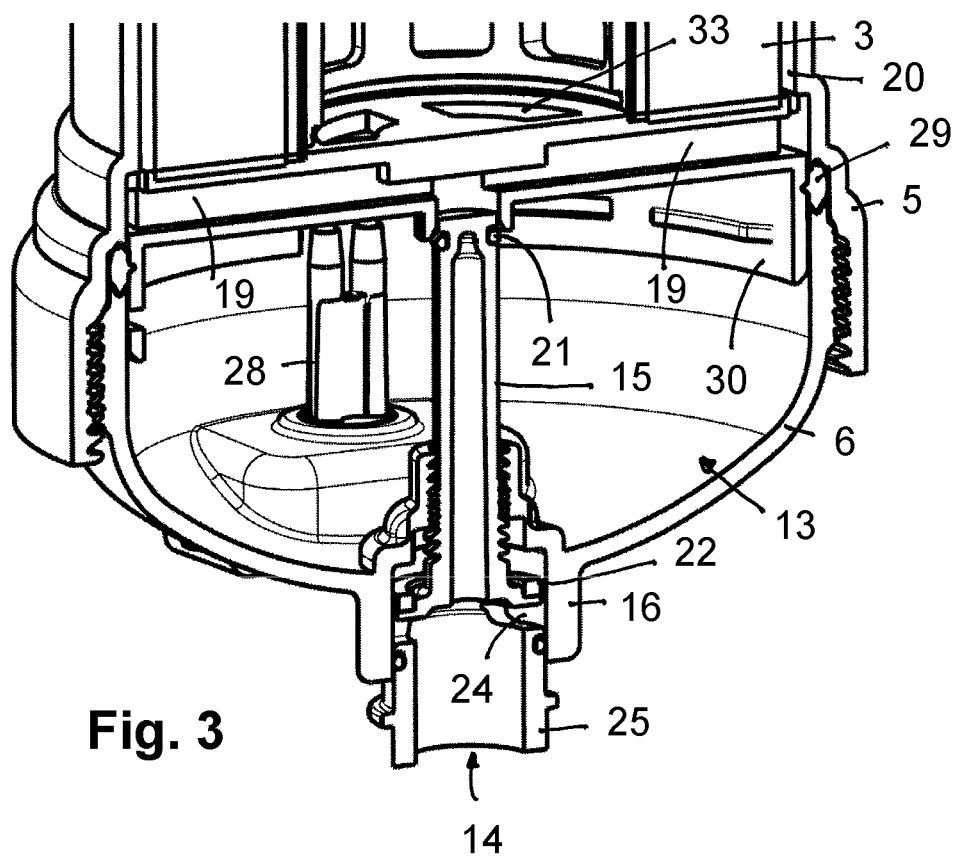
FIG. 3 is an illustration corresponding to FIG. 2 with the drainage device in open drainage position.
Figure 5:
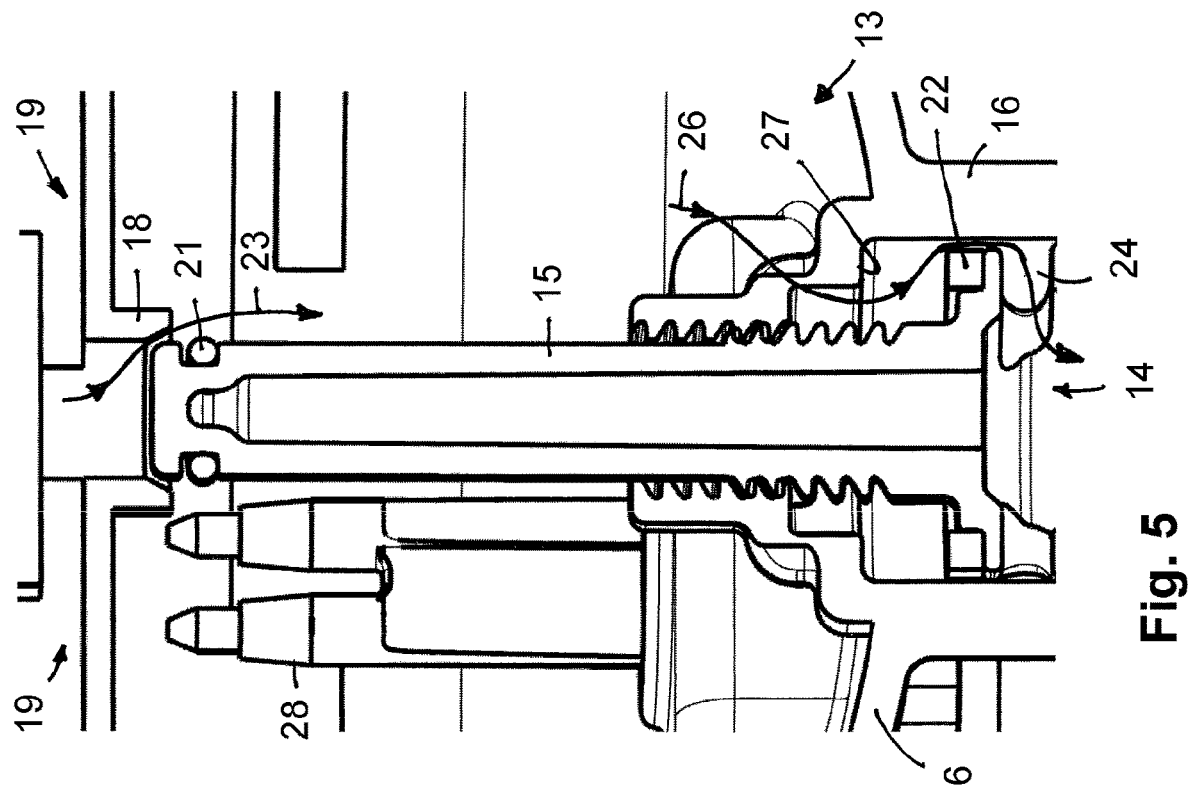
FIG. 5 shows the drainage device in enlarged illustration in the drainage position.
Figure 4:
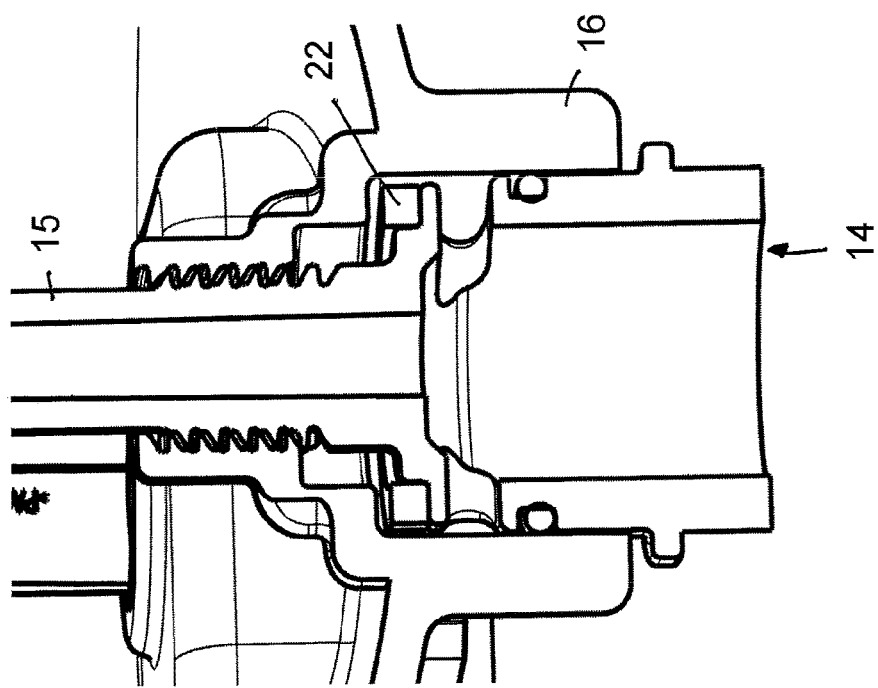
FIG. 4 shows the drainage device in enlarged illustration in the closed position.
Figure 6:
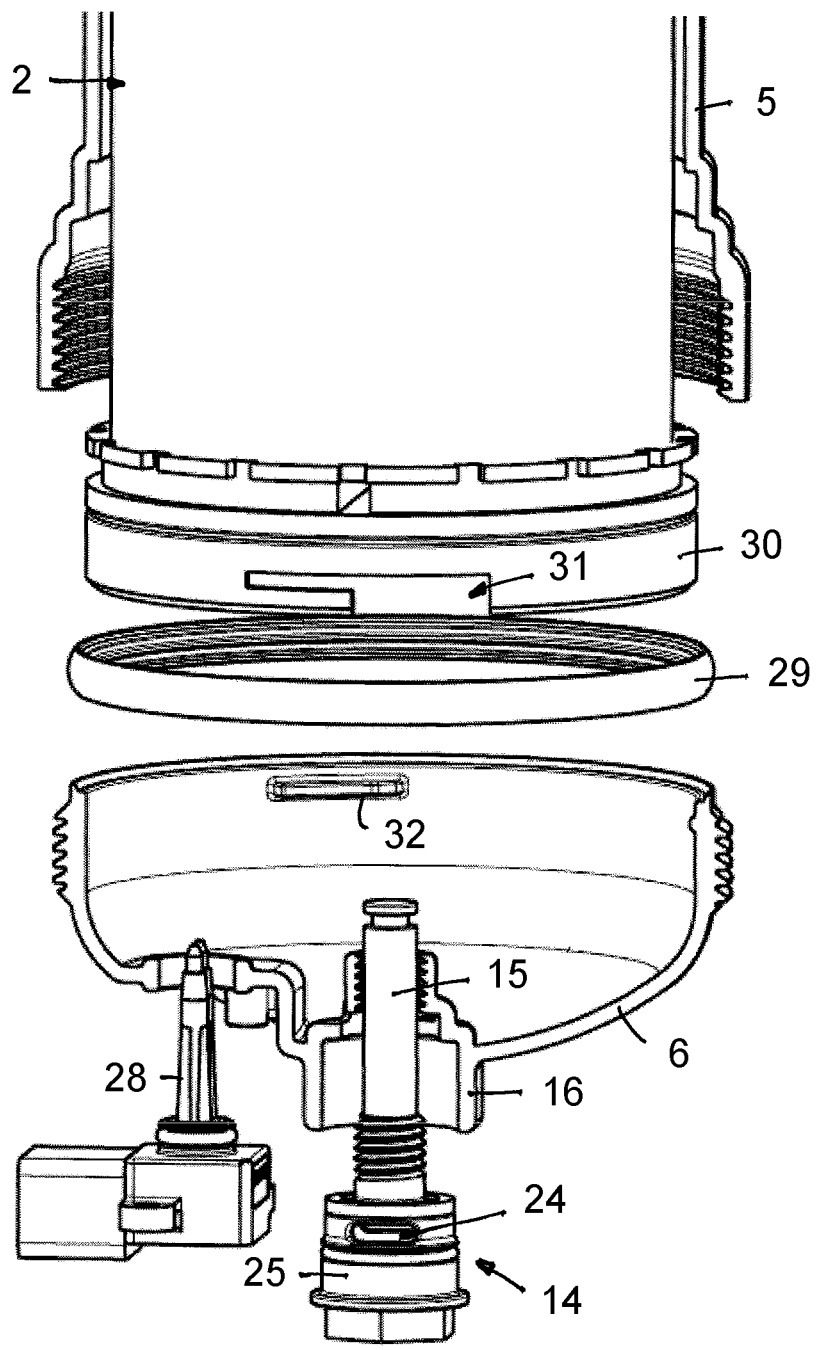
FIG. 6 shows the filter device in exploded illustration.
Figure 7:
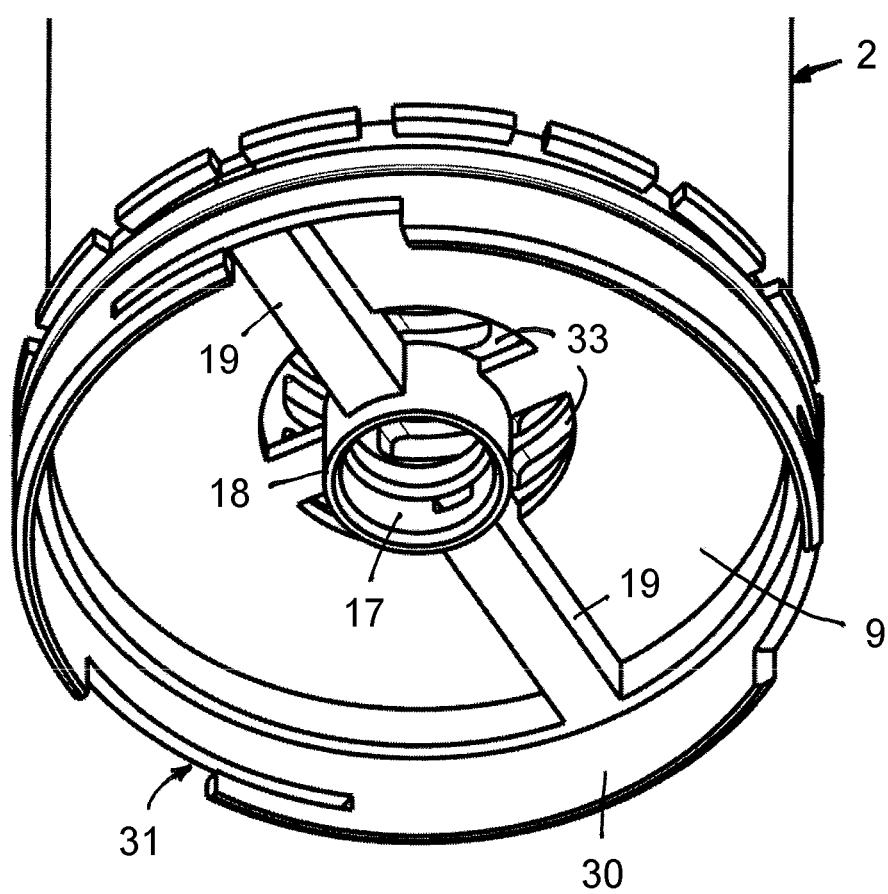
FIG. 7 is a perspective view of the filter element from below.

A drainage device 14 is integrated into the bottom part 6 and is adjustable between a closed position (FIGS. 1, 2, 4) and an open drainage position (FIGS. 3, 5). As an axially adjustable drainage element 15, the drainage device 14 comprises a drainage screw which is screwed into a housing-side sleeve 16 in the bottom part 6. For this purpose, the drainage screw 15 has an outer thread and the sleeve 16 an inner thread. The end face of the drainage screw 15 projects into a central cutout 17 which is provided in an axial sleeve 18 (FIG. 7) which is embodied as one piece together with the bottom end disk 9. The outflow channel 19 extends in this context from a radially outwardly positioned wall surface of the filter medium body 3 to the central cutout 17 which is delimited by the axial sleeve 18 in circumferential direction while the axial sleeve 18 is open at both ends in axial direction. The drainage channel 19 opens at an inner wall surface of the axial sleeve 18, which can be seen in FIG. 7. The cutout 17 in the end disk 9 which is delimited by the axial sleeve 18 in the circumferential direction extends in axial direction completely through the end disk 9, i.e., penetrates the latter.

The cutout 17 is in flow communication with two diametrically opposed outflow channels 19 which extend in radial direction and each extend from the radially outwardly positioned exterior side of the end disk 9 to the central cutout 17. The two outflow channels 19 are located at the bottom face of the end disk 9 and are formed as one piece together with the end disk 9. Each outflow channel 19 is in flow communication at its radially outwardly positioned mouth side with an annular liquid collecting space 20 between the inner wall of the filter base housing 5 and the exterior side of the filter medium body 3, where the unpurified raw fluid is located prior to radial flow through the filter medium body 3.

Adjacent to the tip of the drainage screw 15, a sealing ring 21 is provided which is inserted into an annular groove in the wall surface of the drainage screw 15. This can be seen well in FIG. 5. In the closed position according to FIGS. 1 and 2, the drainage screw 15 has been pushed so far into the axial sleeve 18 at the bottom face of the end disk 9 that the sealing ring 21 is positioned inside the axial sleeve 18. In this way, it is ensured that no liquid can flow out through the outflow channels 19 downwardly in the direction toward the water collecting space 13. In the drainage position according to FIGS. 3 and 5, on the other hand, the drainage screw 15 has been unscrewed from the axial sleeve 18 at the end disk 9 to such an extent that the sealing ring 21 is positioned outside of the axial sleeve 18 and the end face of the drainage screw 15 is also located neighboring the end face of the axial sleeve 18. This makes it possible, as illustrated by the flow arrow 23 in FIG. 5, that the liquid flows out of the outflow channels 19 in the direction of the water collecting space 13.

In the region of the sleeve 16 which opens at the bottom part 6 of the filter housing in downward direction, a base part 25 of the drainage screw 15 is provided with one or a plurality of openings 24 which connect the interior of the hollow-cylindrical base part 25 with the interior of the sleeve 16. In the open drainage position, a sealing ring 22 at the top side of the base part 25 is removed from a sealing support 27 in the sleeve 16 (FIG. 5) so that a flow path according to flow arrow 26 is released from the water collecting space 13 via a flow opening in the inwardly positioned part of the sleeve 16 and farther via the opening 24 in the base part 25 into the interior of the base part so that the liquid collected in the water collecting space 13 can flow out. This liquid is a mixture of the water in the water collecting space 13 as well as of the fluid drained according to flow arrow 23 from the liquid collecting space 20 which is in general fuel or oil. In the open drainage position, the liquid from the liquid collecting space 20 and also the water from the water collecting space 13 are drained.

A water fill level sensor 28 is integrated into the bottom part 6 and delivers a signal as soon as the liquid level in the water collecting space 13 has reached a defined height. In response, the drainage device 14 can be actuated and the drainage screw 15 can be brought into the drainage position.

As can be seen in FIGS. 2, 3, 6, and 7, a circumferentially extending collar 30 is formed as one piece together with the end disk 9 at the radial outer side and is located at the bottom face of the end disk 9 and is provided with form-fit recesses 31 which can be brought to engage form-fit raised portions 32 at the inner wall of the bottom part 6 by a form-fit connection, like a bayonet closure. In the mounted state, an annular sealing element 29 is seated against the outer side of the collar 30 and prevents that liquid from the liquid collecting space 20 at the raw side of the filter medium body can reach immediately the water collecting space 13.

The end disk 9 is also provided with cutouts 33 which are located radially in the region of the interior 11 in the filter medium body 3 and via which water that is separated at the water separating screen 12 can flow out of the interior 11 axially in downward direction into the water collecting space 13.

The second embodiment according to FIGS. 8 to 13 corresponds substantially to the first embodiment and, like the latter, is also suitable for liquid filtration, in particular for fuel filtration so that with regard to identical components reference is being had to the description of the first embodiment.

In contrast to the first embodiment, in the filter device according to FIGS. 8 to 13 the water fill level sensor 28 is not integrated into the bottom part 6 of the filter housing 4 but extends axially through the filter element 2. The water fill level sensor 28 projects through the entire axial length of the filter medium body 3 wherein the electrical connection is provided above the upper end disk 8 and the sensor tips project axially (in downward direction) past the bottom end disk 9. The lower section of the water fill level sensor 28 with the sensor tips projects into the drainage screw 15 embodied as a hollow body and provided with flow openings 34 in its wall so that the interior of the drainage screw 15 is in flow communication with the water collecting space 13 in the bottom part 6. However, the interior in the drainage screw 15 in the section projecting into the water collecting space 13 is separated flow-tightly from the base part 25 of the drainage screw 15 positioned at the bottom, whereby it is prevented that in the closed position of the drainage screw 15 liquid can reach the base part 25 of the drainage screw 15.

As soon as the water level in the water collecting space 13 has reached a certain height, the latter is sensed by the water fill level sensor 28 in the drainage screw 15 and a signal can be produced.

Figure 8:
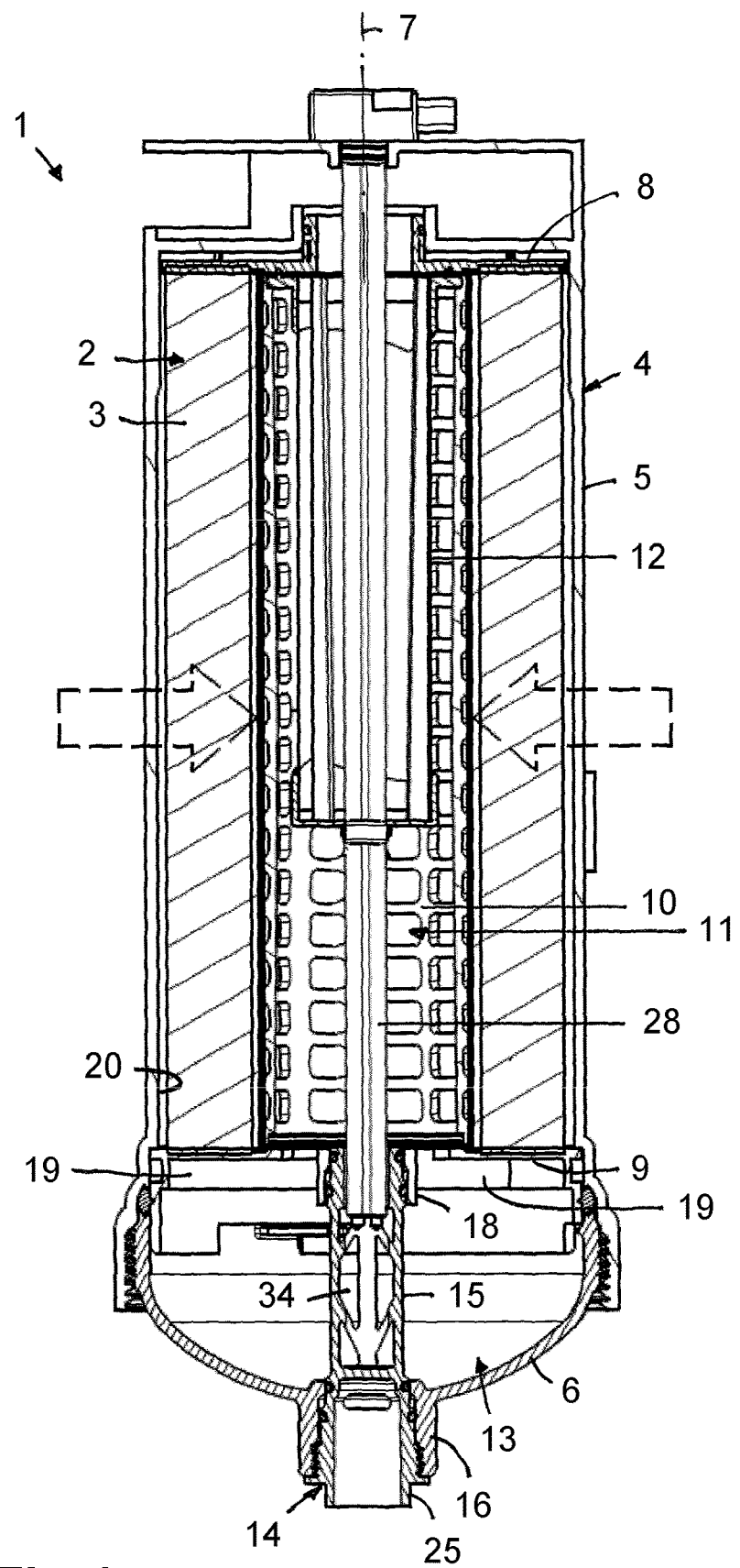
FIG. 8 shows a longitudinal section of a filter device for liquid filtration in an embodiment variant in which a water level sensor extends axially through the filter element.
Figure 9:
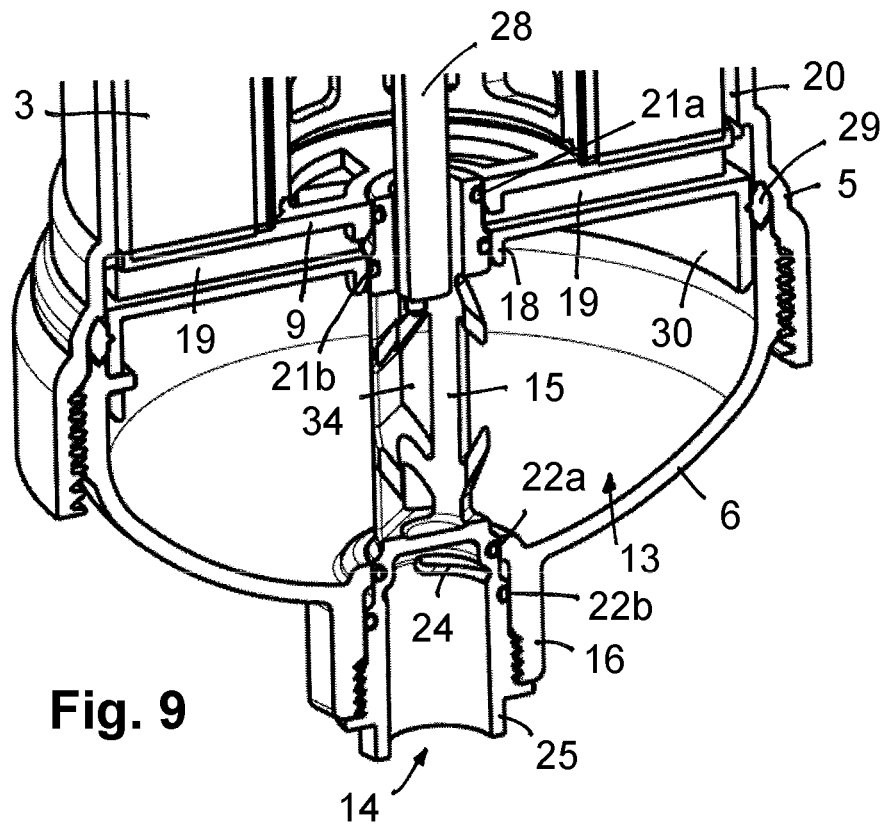
FIG. 9 shows the bottom region of the filter device in perspective view with the drainage device in closed position.

The drainage screw 15 can be adjusted between a closed position, a first drainage position, and a second drainage position. The closed position is illustrated in FIGS. 8 and 9, the first drainage position in FIG. 11, and the second drainage position in FIG. 10. In the closed position, outflow of the purified fluid from the liquid space 20 and also of the water in the water collecting space 13 is impossible. In the first drainage position according to FIG. 11, the drainage screw 15 has been displaced only so far in the direction of the open position that the flow path 26 through the base part 25 of the drainage screw 15 is open and the water can be drained from the water collecting space 13. However, the outflow channels 19 in the bottom end disk 9 are still closed by the drainage screw 15. Adjacent to the top end face, the drainage screw 15 comprises two axially spaced-apart sealing rings 21a and 21b, wherein the upper sealing ring 21a in the first drainage position according to FIG. 11 and also the second sealing ring 21b that is axially spaced apart from it contact seal-tightly the inner wall of an axial sleeve 18 embodied as one piece with the end disk 9. In this context, the diameter of the drainage screw is larger in the region of the sealing ring 21b than in the region of the sealing ring 21a in order to enable easier insertion into the axial sleeve 18 of the bottom end disk 9; in other words, the diameter of the sealing ring 21b is larger than the diameter of the sealing ring 21a. A further essential feature of this embodiment, but also of the embodiment according to which the water level sensor 28 is screwed in from the bottom part 6, resides in that the axial sleeve 18 of the bottom end disk 9 projects axially past the end disk 9. In this way, it is possible that, during the axial displacement of the drainage screw into the first drainage position (drainage of water), the upper flow path from the outflow channels 19 remains still closed so that fuel cannot yet reach the water collecting space 13. Alternatively, the bottom end disk 9 can be designed to be correspondingly thicker in the bottom region in order to enable a sealing action across the predetermined axial travel distance. By the afore described construction features, a substantially pure fraction separation of water and fuel during the drainage process is possible.

In this way, the outflow of liquid from the outflow channels 19 as well as, by means of the sealing ring 21a which is arranged farther upwardly and above the openings of the outflow channels 19, an immediate flow transfer of purified fluid out of the interior of the filter medium body 3 is prevented.

Figure 10:
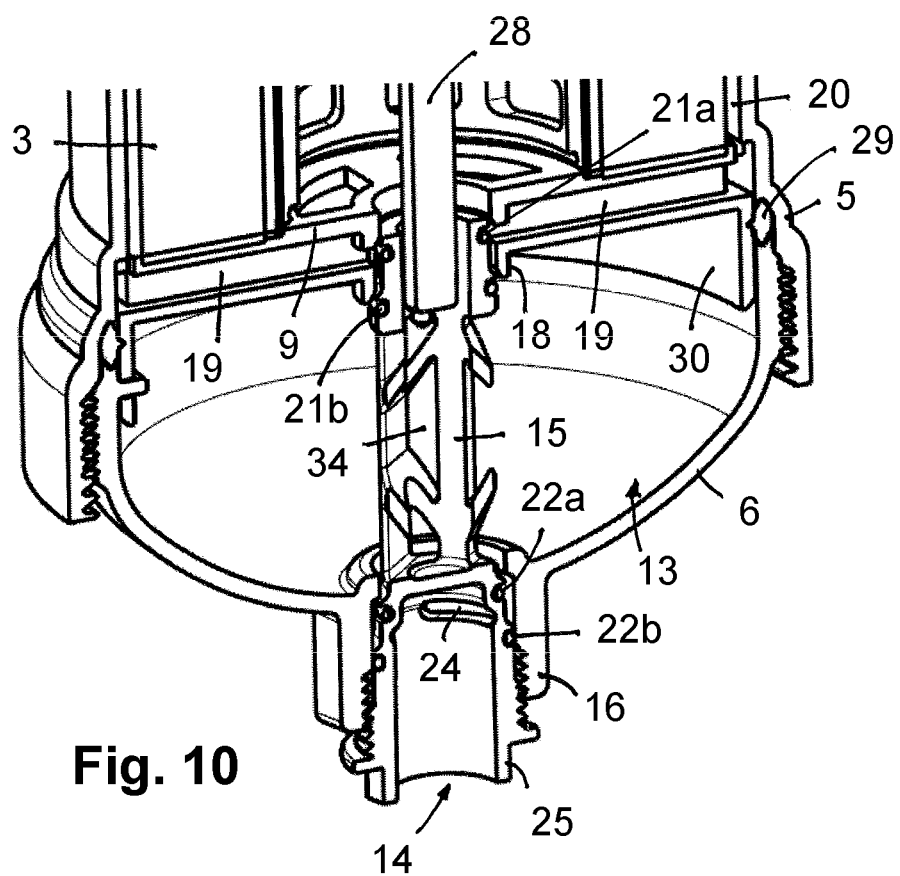
FIG. 10 is an illustration corresponding to FIG. 9 but with the drainage device in open drainage position.
Figure 11:
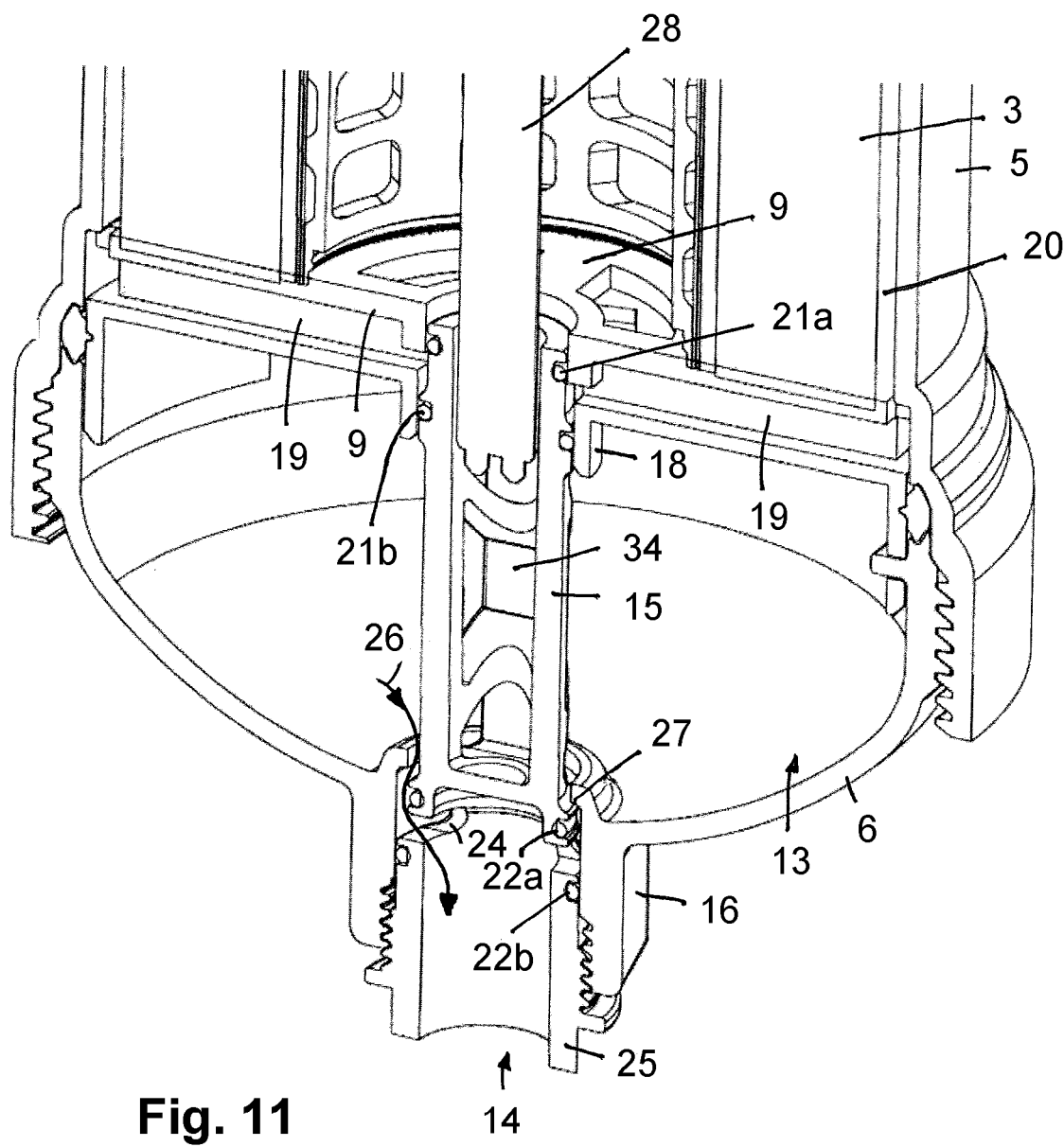
FIG. 11 is a further view according to FIGS. 9 and 10 with the drainage device in a drainage position in which water is drained from a bottom-side water collecting space but drainage of liquid from a liquid collecting space at the filter element is blocked.
Figure 12:
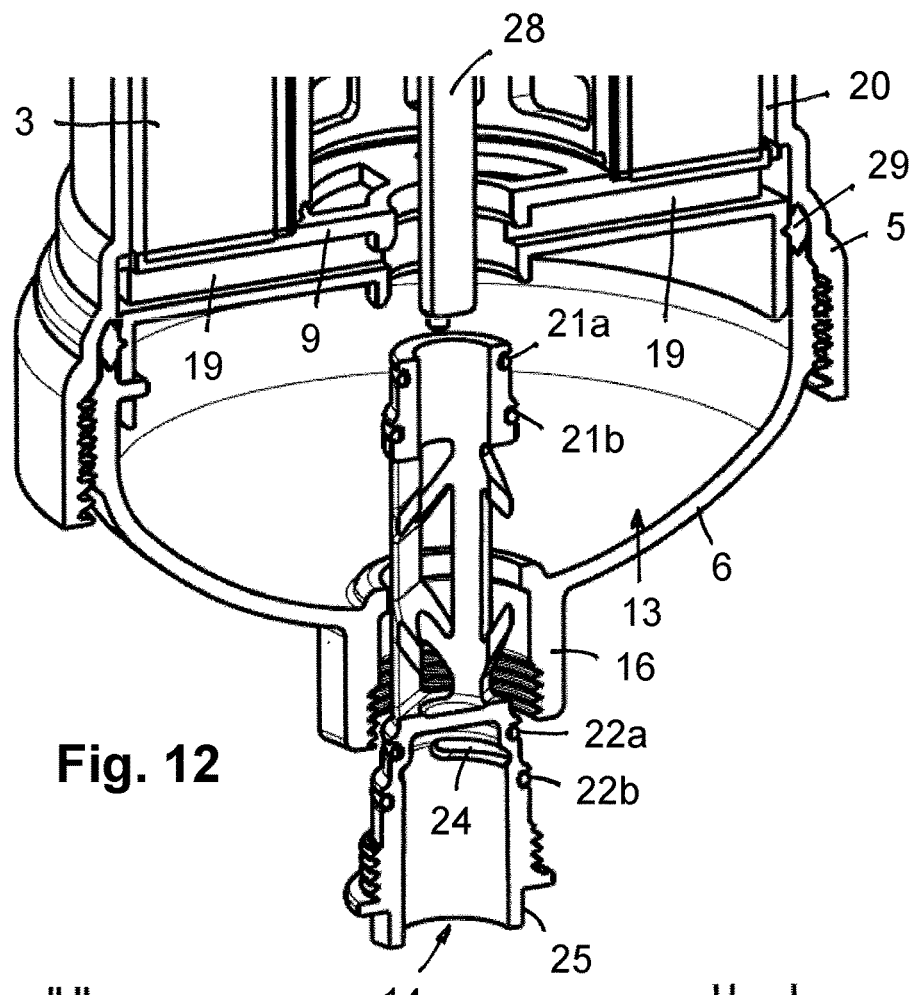
FIG. 12 is a further view according to FIGS. 9 and 10 with the drainage device in unscrewed state.
Figure 13:
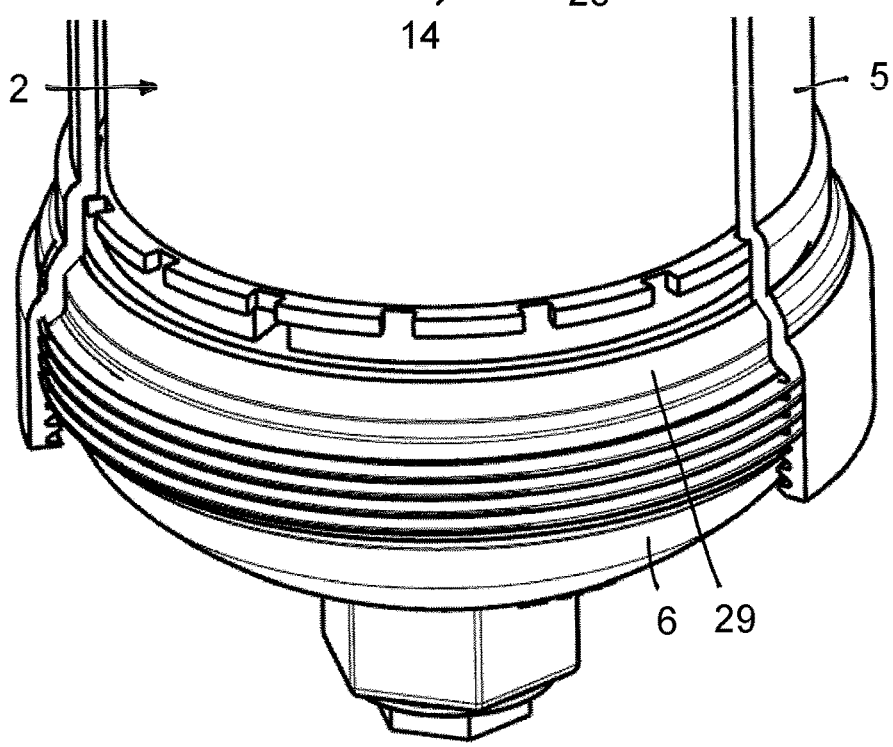
FIG. 13 is a perspective view of a bottom region of the filter device in partially sectioned state.

In the second drainage position according to FIG. 10, the drainage screw 15 has been unscrewed so far that the upwardly positioned sealing rings 21a and 21b are no longer in a sealing position at the inner wall of the axial sleeve 18 at the end disk 9. In this way, an upper flow path through the outflow channels 19 into the water collecting space 13 is released so that the liquid from the liquid collecting space 20 can flow into the water collecting space 13 through the flow channels 19. At the same time, the base part 25 of the drainage screw 15 is in the open position so that the liquid collected in the water collecting space 13 can flow out through the base part 25.

At the base part 25, two sealing rings 22a and 22b are arranged which are axially spaced apart relative to each other. The upper sealing ring 22a ensures in the closed position according to FIGS. 8 and 9 a flow-tight closure so that no liquid can flow out of the water collecting space 13. The sealing ring 22b positioned farther downward and axially spaced apart ensures in the first or second open drainage position (FIGS. 11, 10) that the liquid flowing out of the water collecting space 13 can flow only through the opening 24 in the wall of the base part 25 and cannot spread in the direction toward the outer thread at the base part 25 positioned below.

What is claimed is:

1. A filter element for liquid filtration, the filter element comprising:
    a hollow-cylindrical filter medium body surrounding a longitudinal filter element axis;
    an end disk arranged on and covering an end face of the hollow-cylindrical filter medium body, the end disk comprising:
        a central cutout axially penetrating the end disk;
        an axially projecting annular sleeve formed on an axially outer face of the end disk and projecting axially outward away from the axially outer face of the end disk, the axially projecting annular sleeve surrounding the central cutout;

a circumferential annular collar formed on a radially outer circumference of the end disk and projecting axially outwardly therefrom, the circumferential extending annular collar surrounding the axially projecting annular sleeve;

an elongated outflow channel having a U-shaped cross section and formed on the axially outer face of the end disk and extending across the end disk, wherein the elongated outflow channel carries liquid to be filtered or filtered liquid;

wherein the axially projecting annular sleeve interrupts a central portion of the elongated outflow channel, dividing the elongated outflow channel into two elongated outflow channel portions, each of which connect to the axially projecting annular sleeve and open into an interior of the axially projecting annular sleeve;

wherein the elongated outflow channel portions each extend radially outwards from the axially projecting annular sleeve to a radially outer end positioned at the radially outer circumference of the end disk so as to open at a radially exterior side of the hollow cylindrical filter medium body to receive liquid therefrom;

wherein the elongated outflow channel is configured to be controlled by a drainage device.

2. The filter element according to claim 1, wherein the elongated outflow channel extends in a radial direction relative to a longitudinal filter element axis.

3. The filter element according to claim 1, wherein the two elongated outflow channel portions are arranged diametrically opposed to each other at the end disk.

4. The filter element according to claim 1, wherein the cutout of the end disk is delimited circumferentially by an axial sleeve, wherein the axial sleeve comprises axially opposed open ends.

5. The filter element according to claim 4, wherein the end disk and the axial sleeve are embodied together as one piece.

6. The filter element according to claim 4, wherein the outflow channel opens at an inner wall surface of the axial sleeve.

7. A filter device comprising:

a filter element according to claim 1, a filter housing comprising a liquid collecting space (13) arranged radially in annular space between the filter element and an outer wall of the filter housing, and further comprising the drainage device adjustable between a water drainage position and a closed position;

wherein the filter element is arranged in the filter housing.

8. The filter device according to claim 7, wherein the drainage device comprises:

a closed position, a first drainage position, and a second drainage position, wherein the drainage device in the first drainage position drains exclusively water from the water collecting space and blocks a flow path of liquid to be filtered or filtered liquid from a liquid collecting space arranged radially between the filter element and the filter housing, and wherein the drainage device in the second drainage position drains liquid to be filtered or filtered liquid from the liquid collecting space in addition to draining water from the water collecting space.

9. The filter device according to claim 8, wherein the drainage device further comprises an axially adjustable drainage screw that projects into a central cutout of the end disk of the filter element.

10. The filter element according to claim 1, wherein the circumferential annular collar is formed as one piece together with the end disk.

\* \* \* \* \*